Jan. 24, 1950

C. A. BICKEL ET AL

2,495,312

POWER UNIT FOR MACHINE TOOLS

Filed Jan. 5, 1945

INVENTOR
CLIFFORD A. BICKEL,
STANLEY A. BRANDENBURG,
THEODORE FOSTER
BY
ATTORNEY

Jan. 24, 1950   C. A. BICKEL ET AL   2,495,312
POWER UNIT FOR MACHINE TOOLS
Filed Jan. 5, 1945   5 Sheets-Sheet 4

INVENTOR
CLIFFORD A. BICKEL
STANLEY A. BRANDENBURG.
BY THEODORE FOSTER
ATTORNEY

Jan. 24, 1950   C. A. BICKEL ET AL   2,495,312
POWER UNIT FOR MACHINE TOOLS
Filed Jan. 5, 1945   5 Sheets-Sheet 5

INVENTOR
CLIFFORD A. BICKEL,
STANLEY A. BRANDENBURG,
BY THEODORE FOSTER
ATTORNEY

Patented Jan. 24, 1950

2,495,312

UNITED STATES PATENT OFFICE 2,495,312

POWER UNIT FOR MACHINE TOOLS

Clifford A. Bickel, Stanley A. Brandenburg, and Theodore Foster, Sidney, Ohio, assignors to The Monarch Machine Tool Company, Sidney, Ohio, a corporation of Ohio Application January 5, 1945, Serial No. 571,530

17 Claims. (Cl. 77—32)

This invention relates to power units and, particularly, to geared power units for translating electrical energy into mechanical energy.

In machine tools and the like it is often desired to reciprocate a tool or machine element to and from a working position by means of an electric motor. Also, it is often advantageous to move the movable member rapidly into working position, thereafter to advance it at a reduced rate of speed while accomplishing the work and, finally, rapidly to retract it to an idle position.

In lathes and other machine tools the movement of the work tool is usually accomplished by lead screws, feed rods or gear trains driven from the principal power source of the machine. This involves long gear trains and interlocking controls which are expensive to build and assemble and often difficult to control automatically.

Accordingly it is a principal object of the present invention to provide a unit for reciprocating a work member to and from its working position.

It is another object to provide a unitary device having a built in power unit and control therefor for reciprocating a work tool.

It is another object to provide a device according to the foregoing objects which is adapted to be mounted on the bed or carriage of a lathe or on the column of a drill or other vertical machine tool.

It is another object of the present invention to provide an electrically actuated mechanism for reciprocating a work tool or other machine member.

It is another object to provide an electrically actuated tool reciprocating mechanism wherein the working portion of the advancing stroke thereof is accomplished at reduced speed.

It is another object to provide a device according to the foregoing objects in which the speed of the working portion of the advancing stroke may be varied.

It is still another object to provide a unit, including an electric motor for driving a member, either rotary or reciprocatory, at a plurality of speeds in either direction or to lock the said member against rotation.

It is another object of the invention to provide a unit for accomplishing the foregoing in which the amount of movement of the driven member is precisely controlled.

These and other objects and advantages will become fully apparent upon reference to the following specification taken in connection with the accompanying drawings, in which.

General arrangement

This invention, in general, comprises a unit having a stationary bed on which is movably mounted a member such as a work tool support or other machine element. The movable member, which may be a reciprocable carriage or table may be dove-tailed to the bed and is preferably actuated by a nut and screw arrangement.

The screw is adapted to be driven by a motor through a pair of parallel gear trains. Each gear train includes electrically actuated brakes and clutches whereby one or the other or both may be locked against rotation or drivingly engaged with the said motor.

One of the gear trains also includes a set of change gears so that the rotational speed of the driven screw may be predetermined at will. The other of the gear trains includes a differential unit, the housing of which is drivingly engaged by the first gear train. The output shaft of the differential drives the table reciprocating screw.

By actuating the clutch associated with one of the gear trains while simultaneously actuating the brake associated with the other of the gear trains the table is reciprocated at a certain speed in one direction. By actuating the other of the clutches and the other of the brakes, the table may be reciprocated in the same direction at reduced speed. By restoring the clutches and brakes to their initial condition, while simultaneously reversing the motor, the table may be reciprocated in the opposite direction at a rapid rate. Also, the table may be caused to dwell at any place by actuating both of the said brakes and, by means of a time delay device, be caused to dwell for any predetermined period. Thus, very accurate cuts may be made and the workpiece adequately cleaned up at the end of a cut as, for example, against a shoulder or at the bottom of a recess.

The clutches and brakes are preferably electrically actuated and each pair of brakes and clutches are adapted to actuate a single armature which is keyed or splined to the driven shaft.

The direction of forward feed may be reversed at will so that the fast traverse and slow feed stroke may take place in either direction of movement of the table.

The unit is adapted for mounting in any position and may be connected to drive a screw, a shaft, a rack and pinion or any other movable member.

*Structural arrangement*

Referring now to the drawings more in detail and, particularly, to Figures 1 to 9, inclusive, the unit of this invention comprises a main body or bed casting 10 having a portion 10a attached thereto. Reciprocably mounted upon the bed 10 is the carriage or table 12. The table 12 may be dove-tailed to the bed 10 as indicated at 14 and there may be provided the tapered gib 16 for the purpose of maintaining the dove-tail 14 in precise adjustment.

Mounted on the right end of the unit is a motor 18 which is preferably of an electrically reversible type such as a three phase motor. The shaft 20 of the motor 18 extends into a compartment 22 formed by the portion 10a and the cover plate 10b and within which are a plurality of gears. The shaft 20 has affixed thereto the pinion 24 which meshes with a gear 26 keyed or otherwise suitably secured to the shaft 28. Also pinned or keyed to the shaft 28, or integral with the gear 26, is a pinion 30 which meshes with an idler gear 32, the latter being journalled on a stub shaft which is fastened to the right side of the wall 38 of the bed portion 10a.

The idler gear 32 meshes with a gear 34 which is affixed to the shaft 36 in any suitable manner. The shafts 28 and 36 are journalled on antifriction bearings in the wall 38. On the opposite side of the wall 38 from the gear 26 the shaft 28 has keyed thereto the portion 40 of a magnetic clutch which also comprises the armature 42. The portion 40 comprises a cored member within which is arranged the coil 44. A sleeve of insulating material 46 is placed on the cored member and the slip rings 48 are mounted thereon. A pair of brushes 50 are mounted on the bed portion 10a and engage the slip rings 48 for the purpose of supplying electrical energy to the coil 44. When the coil 44 is energized the armature 42 is pulled into engagement with the surface of the clutch 40 and a driving engagement between the members 40 and 42 is thereby established.

The shaft 36 has affixed thereto, on the opposite side of the wall 38 from the gear 34, the clutch 52. The clutch member 52 is constructed similarly to the clutch member 40, having a coil 54 which, when energized, is effective to draw the armature 56 into driving engagement with the clutch member 52.

The armature 42 is splined to a sleeve 58 which is keyed to a shaft 60, the latter being mounted in antifriction bearings in the bed 10. By means of the splined relationship between the armature 42 and the sleeve 58, the armature is free to reciprocate longitudinally of the said sleeve while remaining in driving engagement therewith.

Mounted in the bed 10 on the opposite side of the armature 42 from the clutch member 40 is a cored or hollow member 62 which includes in the hollow portion thereof the coil 64. The coil 64 is adapted, when energized, to draw the armature 42 into engagement with the face of the member 62. The member 62, being fixed in the bed 10, the energization of the coil 64 is effective to hold the armature 42, and, therefore, the shaft 60 against rotation.

Figure 5:
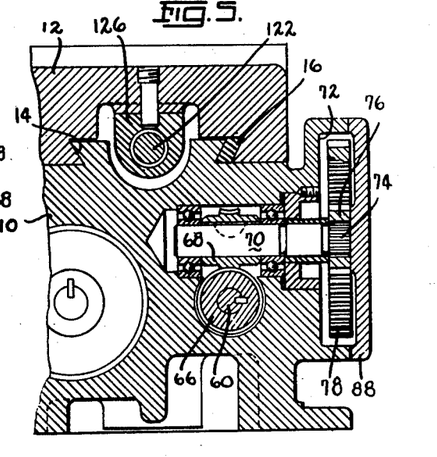

Keyed to the shaft 60 is the worm gear 66 which engages the worm wheel 68 (see Figure 5). The worm wheel 68 is keyed to the shaft 70 which extends laterally outwardly from the bed 10 into a compartment 72. The end of the shaft within the compartment 72 is splined as at 74 and carries a similarly splined gear 76.

The gear 76 meshes with a gear 78 which is splined to the shaft 80 which also extends into the compartment 72. The shaft 80 extends inwardly into the bed 10 and has keyed thereto the worm gear 82 which meshes with the worm wheel 84 on the shaft 86. Upon reference to Figures 2 and 4 it will be seen that the shafts 70 and 80 lie in parallel arrangement and that the shaft 86 is in substantial axial alignment with the shaft 60.

The compartment 72 is fitted with a cover 88 which retains the gears 76 and 78 in position. By removing the cover 88 the gears may be removed from the splined ends of the shafts 70 and 80 and other gears having a different ratio inserted in their place.

The shaft 86 extends leftwardly into a compartment 90 at the left end of the bed 10 and has keyed thereto the gear 92. The gear 92 meshes with a gear 94 which is freely journalled on the stub shaft 96, the latter being mounted in the cover 98 of the compartment 90.

Returning to the armature 56, this member is splined through a sleeve to the shaft 100 in a manner substantially identical with the way in which the armature member 42 is splined to the shaft 60. Also fixed in the bed 10 to the left of the armature 56 is a cored brake member 61 similar to the member 62 and including a coil 63. The energization of the coil 63 is effective to draw the armature 56 into engagement with the brake member 61 thereby to lock the shaft 100 against rotation.

The shaft 100 extends into the right end of a differential unit 102 and has keyed thereto the bevel gear 104. Meshing with the gear 104 are the bevel gears 106 which are freely journalled on the shaft 108 which extends transversely of the housing 110 of the differential 102.

Also in mesh with the gears 106 is the gear 112 which is attached to the shaft 114. The shaft 114 extends out the left end of the differential and into the compartment 90 where it has affixed thereto the gear 116.

The gear 116 is in mesh with the gear 118 which is freely journalled on the stub shaft 96 and is also in continuous mesh with the pinion carried by the screw 122.

The screw 122 is supported in suitable antifriction bearings such as the thrust bearings indicated at 124 (Figure 8) and is in threaded engagement with the nut 126 which is attached to the table or carriage 12.

Returning to the differential unit 102, the housing 110 thereof is rotatably journalled within the antifriction bearings 128 in the bed 10, and has affixed to the left end thereof, within the compartment 90, the gear 130. The gear 130 is continuously in mesh with the gear 94 which, as previously mentioned, is freely journalled on the shaft 96.

Figure 6:
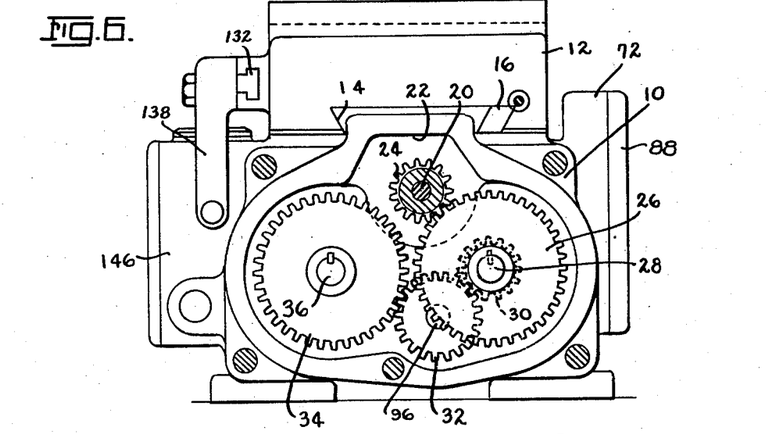
Figures 7, 8:
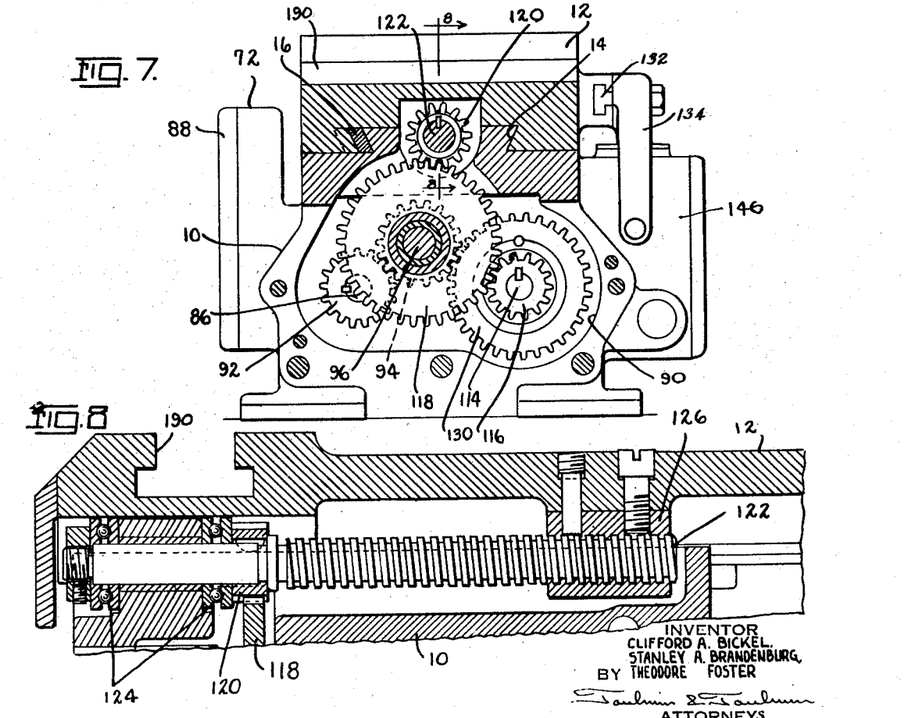
Figure 8 is a vertical longitudinal section through a portion of the device and is indicated by the line 8—8 on Figure 7.
Figure 9:
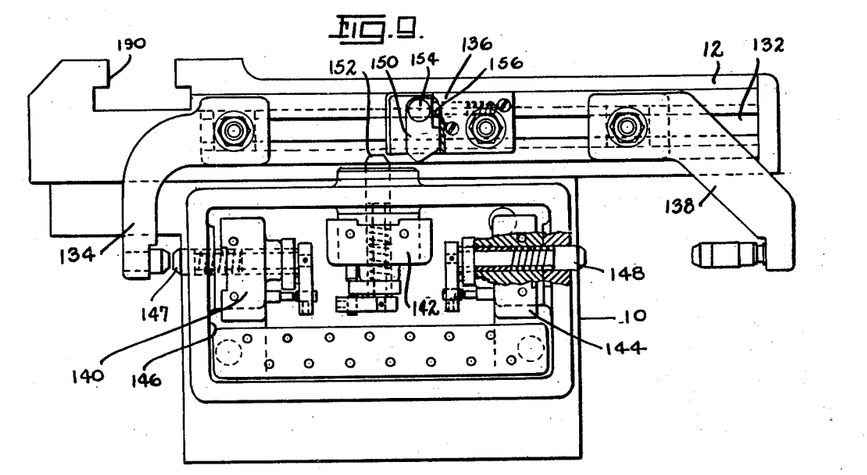
Figure 9 is a side view of the device partly broken away and showing the limit switches and stops which control the reciprocation of the reciprocable portion.

Referring to Figures 6, 7 and 9, it will be seen that the table 12 comprises a T slot 132 on one side thereof which is adapted to receive a plurality of cam members indicated at 134, 136 and 138. The cam members are adapted to actuate the limit switches 140, 142 and 144 (Figure 9) which are mounted within the compartment 146 of the bed 10. The switch 140 has associated therewith the spring loaded plunger 147 which is adapted to be engaged by the cam member 134 when the table 12 is in its extreme right hand position. Similarly associated with the switch 144 is the spring loaded plunger 148 which is adapted to be engaged by the cam 138 when the table is in its extreme left hand position. The cam 136 carries an arm 150 which is adapted to engage a spring loaded plunger 152 associated with the switch 142 as the table 12 moves leftwardly thereby to actuate the said switch. As the table 12 moves rightwardly the arm 150 pivots about the pin 154 and thus passes over the plunger 152 without actuating the switch 142. Suitable means such as the spring pressed plunger 156 may be provided for urging the arm 150 into its Figure 9 position after it has passed over the plunger 152 during the leftward movement of the table 12.

*Electrical circuit*

Figure 10:
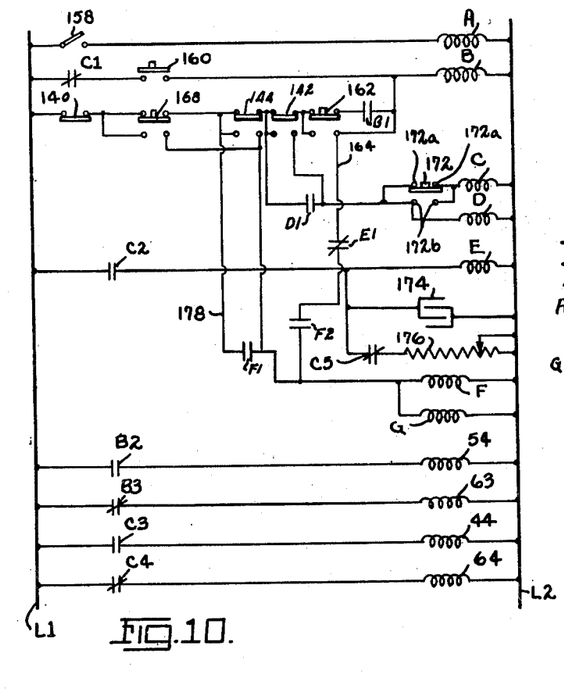
Figures 10 and 11 illustrate one form of electrical circuit adapted to be used in connection with this device.
Figure 11:
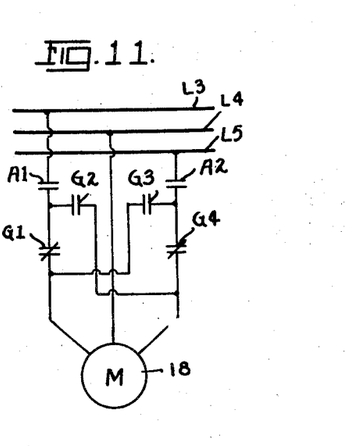

In Figures 10 and 11 is shown the electrical circuit which controls the actuation of the clutches and brakes and of the motor.

The motor 18 is preferably a three phase motor but may be of any other type which may be electrically reversed by means of relays. The relays and contactors are supplied with direct current power from any suitable source such as a generator or electronic rectifier.

Referring to Figure 10 the direct current power supply lines are indicated at L1 and L2. Connected between the lines L1 and L2 is a contactor coil A which is adapted to be energized by the closing of the switch 158. Associated with the contactor coil A are the normally open blades A1 and A2 which, upon being closed by the energization of the contactor coil A, conduct power to the motor 18 from the three phase power lines L3, L4 and L5, (Figure 11).

Connected between L1 and L2 is the contactor coil B which has in series therewith the normally open push button 160 and the normally closed contactor blades C1. The contactor coil B is operable, when energized, to close the contactor blades B1 and B2, and to open the blades B3. The blades C1 and the switch 160 are bypassed by a line including the normally open blades B1, the normally closed contacts of push button switch 162, the normally closed contacts of the single pole double throw limit switch 142, the normally closed contacts of the single pole double throw limit switch 144, the normally closed contacts of the push button switch 168, and the normally closed contacts of limit switch 140. The push button switch 160 and the normally closed blades C1 are further bypassed by a line 164 which includes the normally closed blades E1, the normally open blades F2 and F1, line 178, the normally closed contacts of push button switch 168, and the normally closed contacts of limit switch 140.

The contactor coils C and D are connected between the lines L1 and L2 by a line which includes the normally open contact blades D1 of the contactor coil D, the normally closed contacts of single pole double throw limit switch 144, the normally closed contacts of push button switch 168, and the normally closed contacts of limit switch 140. Also connected serially with the contactor coil C is the push button switch 172 having the normally closed contacts 172a and the normally open contacts 172b. The contactor coil C is operable, when energized, to close the blades C2 and C3 while opening the blades C1, C4 and C5. The contactor coil D, when energized, closes the blades D1.

A contactor coil E, having normally closed blades E1, is connected between the lines L1 and L2 through the normally open contactor blades C2 of the contactor coil C. Connected in parallel with the contactor coil E is a condenser 174 which has shunted there across the adjustable resistor 176. Serially connected with the resistor 176 are the normally closed blades C5 of the contactor coil C. The condenser resistor arrangement is for the purpose of delaying the opening of the contactor coil E for a purpose which will be described hereinafter.

A pair of contactor coils F and G are connected between the lines L1 and L2 through a pair of normally open contactor blades F1, the normally closed contacts of the push button switch 168 and the normally closed contacts of limit switch 140. Contactor coil B is shunted with contactor coils F and G through the normally open blades F2 and normally closed blades E1.

The coil 54 of the clutch member 52 is connected between the power lines through the normally open blades B2 of the contactor B while the coil 63 of the brake member 61 is connected between the power lines through the normally closed blades B3 of the contactor B.

The coil 44 of the clutch member 40 and the coil 64 of the brake member 62 are connected between the lines L1 and L2 by the normally open contacts C3 and the normally closed contacts C4 respectively.

The contactor coil G is for the purpose of reversing the direction of rotation of the motor 18 and, to this end, has associated therewith the contact blades G1, G2, G3 and G4 (Figure 11). The blades G1 and G4 are normally closed and in series with the blades A1 and A2 of the contactor coil A. When the contactor coil G is energized, the blades G1 and G4 open while the blades G2 and G3 close thus reversing the phase rotation of the motor 18, and, therefore, also the direction of rotation thereof.

*Operation*

Figure 1:
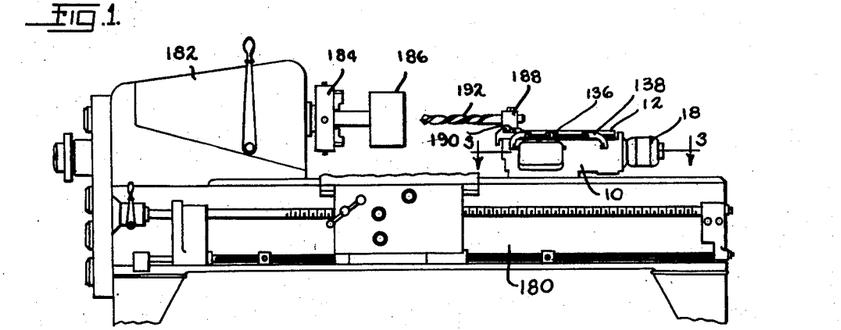
Figure 1 is a diagrammatic view of a lathe equipped with a tool reciprocating mechanism according to this invention.
Figure 2:
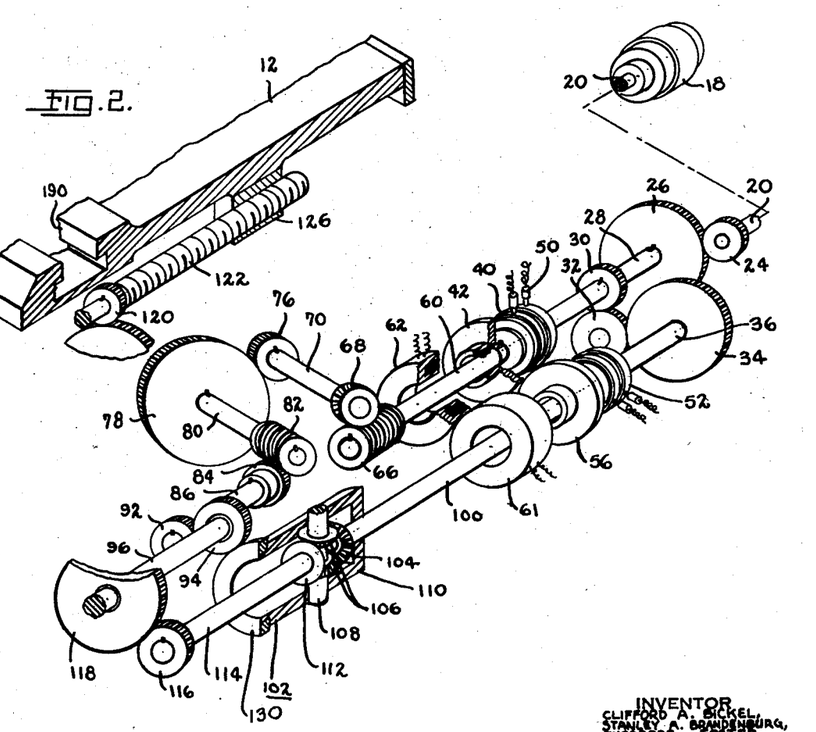
Figure 2 is a diagrammatic perspective of the tool reciprocating mechanism.
Figure 3:
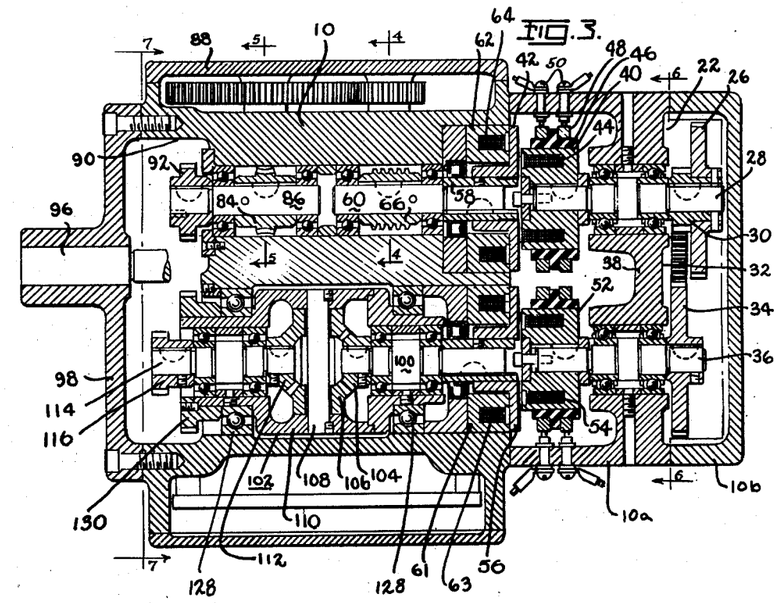
Figure 3 is a plan section through the tool reciprocating mechanism and is indicated by the line 3—3 on Figure 1.
Figure 4:
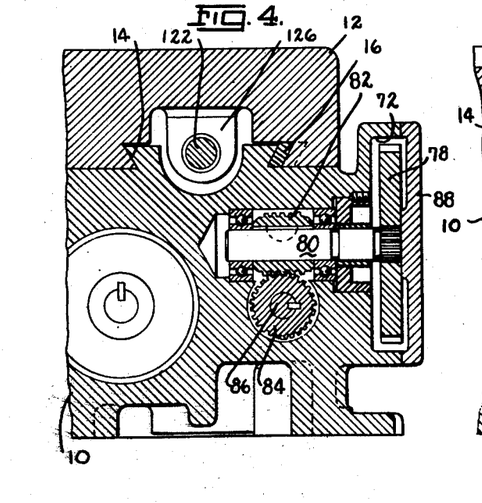
Figures 4, 5, 6, and 7 are sections through the device and are indicated by the lines 4—4, 5—5, 6—6 and 7—7 on Figure 3.

Assume that the device of this invention is mounted on the bed of a lathe as indicated in Figure 1 wherein the lathe may comprise a bed 180, a headstock 182 and a work holding means at 184 which supports a workpiece 186.

Any suitable and well known system of controls may be used in association with the lathe. By way of example a tool holder 188 is mounted in the T slot 190 of the table 12. Supported in the tool holder 188 is a drill 192. The drill is adapted, upon actuation of the bed 12, to engage the workpiece 186 and to perform a working operation thereon.

To commence a work cycle the operator closes the switch 158 which energizes the contactor coil A, thus closing the blades A1 and A2, and energizes the motor 18 to run in a forward direction. The operator then closes the push button switch 160 to energize the contactor coil B, a holding circuit for which is established through contact blades B1 push button switch 162, limit switch 142, limit switch 144, push button switch 168 and limit switch 148.

Energization of the coil B is effective to close the blades B2 while opening the blades B3 in addition to the closing of the aforementioned blades B1. The closing of the blades B2 energizes the coil 54 of the clutch member 52 while the opening of the blades B3 deenergizes the brake coil 63 of the member 61. The armature 56 is thus moved rightwardly into driving engagement with the clutch member 52. At the same time the coil 64 of the brake member 62 is energized while the coil 44 of the clutch member 40 is deenergized, thus moving the armature 42 into engagement with the said brake member.

The mechanical drive from the motor to the screw 122 is now through the shaft 20 into the gear 24, thence into the gear 26 and through the shaft 28 into the gear 30. From the gear 30 power is transmitted through the idler gear 32 into the gear 34 and thence through the shaft 36 into the clutch member 52 and the armature 56.

Rotation of the armature 56 drives the shaft 100 and the gear 104 of the differential unit 102.

As mentioned before, the armature 42 is locked against rotation by the engagement thereof with the brake member 62. The shaft 60 is thus held against rotation and the gear train including the worm gear 66, worm wheel 68, the gears 76 and 78, the worm gear 82, the work wheel 84, the gears 92 and 94 is held against rotation. The engagement of the gear 94 with the gear 130 keyed to the housing 110 of the differential unit 102 is effective to hold the said differential housing against rotation. Accordingly, the aforementioned rotation of the bevel gear 104 is effective through the gears 106 to rotate the gear 112.

The rotation of the gear 112 is transmitted through the shaft 14 to the gear 116 which, in turn, drives the gear 118. The gear 118 drives into the gear 120 on the screw 122 and the said screw is thereby rotated. Rotation of the screw 122 moves the table 12 leftwardly until the cam 136 engages the plunger 152 of the limit switch 142. The cam member 136 is preferably adjusted so that the arm 150 thereof actuates the plunger 152 slightly before the tool 192 engages the workpiece 186.

When the limit switch 142 is actuated, the holding circuit to the contactor coil B is broken, thereby deenergizing the same. Deenergizing of B permits the blades B2 to open and the blades B3 to close, thereby deenergizing the clutch coil 54 while simultaneously energizing the brake coil 63. The actuation of the switch 142 also completes a circuit to the contactor coils C and D which are held by the circuit established through the contactor blades D1, the limit switch 144, the push button switch 168, and the limit switch 140. Energization of the contactor coil C opens the blades C1 and C4, while simultaneously closing blades C2 and C3. The closing of the blades C3 energizes the clutch coil 44 of the clutch member 40, while opening of the blades C4 deenergizes the brake coil 64 of the brake member 62.

Thus, the armature 42 is held in driving engagement with the clutch member 40 while the armature 56 is moved into engagement with the brake member associated therewith.

The drive from the motor 18 is now through the shaft 20, the gear 24 and the gear 26 into the shaft 28. The shaft 28 drives the clutch member 40 and the armature 42.

The rotation of the armature 42 rotates the shaft 60 and the worm gear 66. The worm gear 66 drives through the worm wheel 68 into the shaft 70 and thence through the gears 76 and 78 into the shaft 80 and the worm gear 82. The worm gear 82 drives into the gear 84 and the shaft 86 into the gear 92. The gear 92 drives the gear 94 which is in mesh with the gear 130 of the differential unit 102.

As mentioned before, the armature 56 is locked against the brake member 61 and the shaft 100 and the gear 104 are thereby held against rotation. Thus, as the gear 94 rotates the gear 130 and the housing 110 of the differential unit 102, the shaft 114 is rotated by the cooperation of the gears 106 with the stationary gear 104 and the gear 112 on the said shaft.

As before, rotation of the shaft 114 rotates the gear 116 which drives the gear 118 which in turn drives the screw 122 through the pinion 120. The direction of rotation of the screw 122 is such that the table 12 continues to move in the same direction but the gear ratio between the motor 18 and the said screw is such that the said table moves at a reduced rate. The change gears 76 and 78 determine the particular rate of movement of the table 12 and are selected so that the said rate has an optimum value.

The table 12 continues to move left at reduced speed, until the cam 138 engages the plunger 148 of the switch 144 and interrupts the holding circuit to the contactor coils C and D. Deenergization of the contactor coil C permits the blades C2 and C3 to open, while the blades C1, C4 and C5 close.

The opening of the blades C3 deenergizes the coil 44 of the clutch member 40 while the closing of the blades C4 energizes the coil 64 of the brake member 62. This again moves the armature 42 into engagement with the brake 62 thus holding the former against rotation.

The actuation of limit switch 144 also completes a circuit to contactor coils F and G, and the motor 18 is reversed by the opening of blades G1 and G4, and the closing of blades G2 and G3. As contactor coil F is energized, blades F1 and F2 are closed. Blades F1 complete a holding circuit for the coils of contactors F and G. Blades F2 complete a holding circuit for the coil of contactor B. The closing of blades F2, however, is not effective to energize the coil of contactor B until blades E1 have closed. The contactor coil E remains energized for a predetermined length of time, while the energy stored therein is dissipated through the condenser resistor arrangement 174, 176. The resistor, being adjustable, may be set to predetermine this time interval within relatively close limits.

It will be noted that, at this time, both of the brake coils are energized so that the entire gear train to the table reciprocating screw 122 is locked. The table 12 is thus locked in position and dwells for a predetermined length of time determined by the aforementioned time delay circuit.

Upon the accomplishment of the time delay period, the contactor E drops out and closes the blades E1 associated therewith. The closing of blades E1 establishes a circuit from the line L2 through the contactor coil B through blades F2, blades F1, push button switch 168 and limit switch 140 to line L1. The contactor coil B is thereby energized, and the blades B2 are closed to energize the coil 54 of the clutch member 52, while the blades B3 open and deenergize the the brake coil 63 of the brake member 61.

The clutches and brakes are now energized in the same manner as they were when the table 12 was moving rapidly to the work. However, the motor 18 is revolving in the opposite direction and the screw 122 is also revolving in the opposite direction. Therefore, the table 12 is retracted from the work at a relatively high rate of speed.

During the retraction stroke of the table 12, the cam 136 passes over the plunger 152 but does not actuate it because of the pivoted arm 150.

The table 12 continues its retraction stroke until the cam member 134 engages the plunger 147 and actuates the limit switch 140.

The actuation of the limit switch 140 interrupts the holding circuit for the contactor coil B so that the blades B2 open and deenergize the coil 54 while the blades B3 close and energize the coil 63.

The actuation of the switch 140 is also effective to interrupt the holding circuit of the contactors F and G thereby deenergizing the said contactors. The deenergization of the contactor coil G permits the blades G1 and G4 thereof to close while the blades G2 and G3 are opened. This restores the original electrical connections to the motor 18 for rotation in a forward direction.

It will be noted that both of the brake coils 63 and 64 are again energized so that the table 12 is once more locked in position.

The device is now ready for a new working cycle which may be instituted by depressing a button 160.

The push button switch 172 is provided for the purpose of halting the feeding of the tool into the work whenever desired, and also for the purpose of "inching" the table 12 forward.

The push button switch 168 may be depressed at any time to return the table 12 to its initial position, while the push button switch 162 may be depressed at any time during the rapid traverse of the table 12 toward or from the work to stop the movement of the said table or to "inch" the same.

Figure 12:
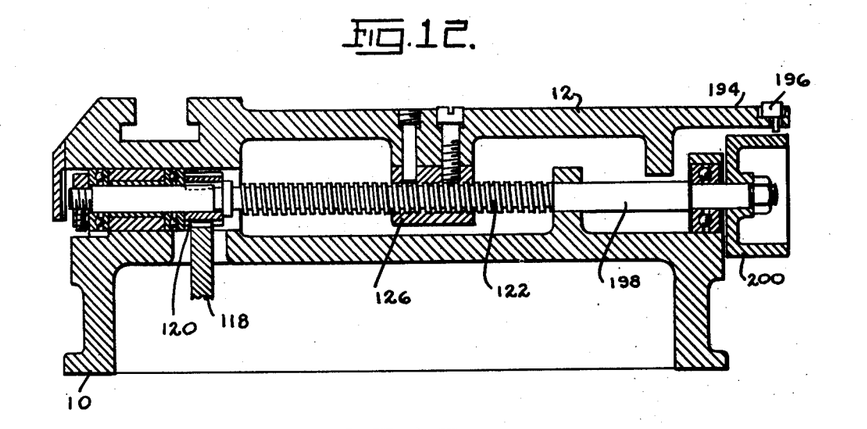
Figures 12, 13 and 14 show a modified arrangement of limit switches and stops.
Figure 13:
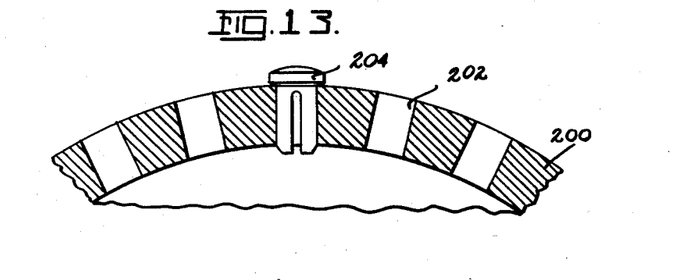
Figure 14:
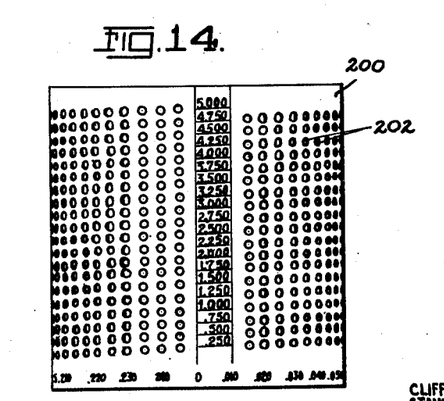

*Modified construction of Figures 12, 13 and 14*

Referring now to Figures 12, 13 and 14, a modified arrangement for actuating the control limit switches is shown.

The table 12 has attached thereto a tail piece on which is mounted a switch 196.

The table reciprocating screw 122 has a rearward extension 198 which carries a drum.

The drum 200 has spirally arranged therearound a plurality of holes 202 which are adapted to receive the buttons 204 which are adapted to actuate the plunger of the limit switch 196.

By calibrating the drum, the buttons 204 may be placed therein so that any predetermined travel of the table 12 may be obtained. This travel may be divided into rapid forward traverse and slow forward traverse as desired.

It will be apparent that this invention is by no means limited to the specific structure and arrangement and application illustrated in the drawings, but is capable of being modified in various manners. For example, the lathe illustrated in Figure 1 could additionally comprise a unit mounted to reciprocate a tool transversely of the axis of the workpiece without in any way departing from the spirit of this invention. Likewise, the device of this invention could be mounted vertically so as to present a tool to the upper surface of the workpiece, if desired.

The differential unit at 102, while it is illustrated as a geared device employing bevel gears, could, it will be understood be replaced by a planetary or epicyclic gear train if found desirable. Likewise, although the output member is shown as a screw, it will be apparent that a rack and pinion or a drive shaft or any other power absorbing or transmitting means could be actuated by the output shaft 114.

It will also be apparent that while only one drive motor is shown in the drawings there could be a drive motor for each of the shafts 28 and 36 and that these motors could be reversible and variable speed or constant speed as desired. These motors could also comprise braking means integral therewith in which case the brake units 61 and 62 would be eliminated and the shaft 60 and 100 made integral with the shafts 28 and 36, respectively.

In the event that exceedingly close control of the driven member was not required, the motors could drive through self-locking worm gears into the shafts 28 and 36 and, if suitable controls were provided, the motors could be energized to actuate the shafts and de-energized to lock them. Thus, while it is preferable, for the accurate control of the driven member, to employ electrically actuated clutches and brakes for driving and for braking the shafts 60 and 100, in certain instances other, less precise, electrically actuated means could be provided for performing this function.

Accordingly, it is desired to comprehend such modifications in arrangement and structure and substitution of equivalents as may be considered to come within the spirit of the invention and the scope of the appended claims.

We claim:

1. In combination with a source of power and a member to be driven, a first means for driving said member from said source of power, a second means for driving said member from said source of power, electrical means for selectively rendering said driving means effective or ineffective and a control circuit for controlling said electrical means and adapted automatically in response to predetermined movements of said driven member for bringing about the actuation of said electrical means, said first means including a variable speed transmission connected between said source of power and said driven member for adjusting the speed of the latter.

2. In a power transmission, a member to be driven, a source of power for driving said member, a first means operatively interconnecting said source of power with said member, a second means operatively interconnecting said source of power with said member, electrical control means automatically operable in response to the movement of said driven member to render said first means ineffective and said second means effective thereby to cause said source of power to drive said member at a predetermined speed, said control means also being automatically operable in response to the movement of said driven member to render ineffective said second means while rendering effective said first means thereby to cause said source of power to move said member at a second predetermined speed, said first means including a variable speed transmission connected between said source of power and said driven member for adjusting the speed of the latter.

3. A power transmission adapted for interconnecting a reversible source of power with a driven member comprising an output member adapted to be drivingly connected with said driven member, a first interconnecting means connecting said output member with said source of power, and a second interconnecting means connecting said output member with said source of power, said second means including a geared differential having its input shaft driven from said source of power and its output shaft in driving engagement with said output member, said first means including a variable speed transmission connected between said source of power and said driven member for adjusting the speed of the latter.

4. A power transmission comprising a source of power, an output member, a first and a second interconnecting means connecting said source of power with said output member, said second means including a geared differential having its output shaft in driving engagement with said output member and its housing in driving engagement with said first means, and electrical control means automatically operable to disconnect either said first or said second means from said source of power, said first means including a variable speed transmission connected between said source of power and the housing of said differential for adjusting the speed of the latter.

5. A power transmission comprising a reversible motor, an output shaft adapted to be driven in both directions by said motor, a first and a second interconnecting means connecting said motor with said shaft, each of said means including clutch means operable in response to the movement of said output shaft to connect or disconnect said means from said motor, said first means also including a variable speed transmission comprising change gear means connected between said motor and said output shaft.

6. In a power transmission a source of power, a movable member adapted to be driven by said source of power, first shaft means interconnecting said source of power with said movable member, second shaft means connected with said source of power and including a gear differential, means drivingly connecting said first shaft means with the housing of said differential unit, electrically actuated cluch means associated with each of said shaft means operable to disconnect the same from said source of power, electrically actuated brake means associated with each of said shaft means operable to lock the same against rotation, and a common control circuit adapted automatically in response to the movements of said member for controlling the energization of said clutch and brake means.

7. In a power transmission a source of power, a movable member adapted to be driven by said source of power, first shaft means interconnecting said source of power with said movable member, second shaft means connected with said source of power and including a geared differential, means drivingly connecting said first shaft means with the housing of said differential unit, and electrical control means including clutch and brake means for each of said shaft means and being operable to disconnect either or both of said shaft means from said source of power while simultaneously locking the same against rotation.

8. The combination in a power transmission of a geared differential having an output shaft, an input shaft and a rotatable frame, driving means for driving said input shaft and said frame, clutch means operable to connect or to disconnect said input shaft and said frame from said driving means, brake means operable to lock either said input shaft or said frame or both against rotation, common control means operable in response to the movement of said output shaft for controlling the actuation of said clutch means and said brake means, and a variable speed transmission comprising change gear means connected between said driving means and said rotatable frame.

9. The combination in a power transmission of a geared differential having an output shaft, an input shaft and a rotatable frame, a motor for driving said input shaft at a substantially constant speed, clutch means operable to connect said input shaft to said motor, brake means operable to lock said input shaft against rotation, means including gear change means for driving said differential frame at selectable speeds from said motor, clutch means for connecting said frame with said motor, brake means for locking said frame against rotation, and control means for controlling the actuation of said clutches and said brakes in response to the movements of said output shaft.

10. The combination in a power transmission of geared differential means having an output shaft, an input shaft and a rotatable frame, driving means for driving said input shaft and said frame, electrically actuated clutch means operable to connect said input shaft with said driving means or said frame with said driving means, electrically actuated brake means operable to lock said input shaft or said frame or both against rotation, electrical control means for controlling the actuation of said clutch means and said brake means, and a variable speed transmission comprising change gears located between said driving means and said differential means.

11. In a power transmission, a geared differential having an output shaft, an input shaft and a frame, means rotatably supporting said frame, a single driving means for driving said input shaft and said frame, magnetic clutch and brake means operable to connect said driving means with said input shaft while holding said frame against rotation, or for connecting said driving means with said frame while holding said input shaft against rotation, said magnetic means also being operable to hold both said input shaft and said frame against rotation, and a variable speed transmission connected with said driving means and said frame for adjusting the speed of the latter.

12. In a power transmission, a geared differential having an output shaft, an input shaft and a frame, means rotatably supporting said frame, a motor adapted to drive said input shaft or said frame, gear change means for adjusting the speed at which said frame is driven, magnetic clutch means operable to connect either said frame or said input shaft with said motor while simultaneously locking the other against rotation, means for locking both said frame and said input shaft against rotation, and control means automatically operable for controlling the actuation of said clutch means in response to the movements of said output shaft.

13. In a power transmission a geared differential having an input shaft, an output shaft, and a frame, means rotatably supporting said frame, a reversible driving means for driving said input shaft or said frame, means including change gears for adjusting the speed at which one of said frame and input shaft is driven, clutch means operable to connect said input shaft or said frame with said driving means, brake means operable to lock said input shaft against rotation when said frame is being driven or vice-versa, said brake means also being operable to lock both said frame and said input shaft against rotation simultaneously, and control means operable to control the actuation of said clutch means and said brake means and the direction of rotation of said driving means whereby said output shaft may be operated at a first or a second speed in one direction or operated in the other direction.

14. In combination with a member to be reciprocated, a geared differential having an output shaft in operative association with said reciprocable member, said differential also having an input shaft and a rotatable frame, a motor for driving said input shaft or said frame, means operable to disconnect either said input shaft or said frame or both from said motor, and control means operable in response to a predetermined reciprocation of said reciprocable member for controlling the actuation of said disconnecting means.

15. In combination with a reciprocable member, a geared differential having an output shaft, an input shaft and a frame, means rotatably supporting said frame, means including a screw and nut drivingly interconnecting said member with said output shaft, a motor for driving either said input shaft or said frame, means for holding said frame against rotation while driving said input shaft from said motor in a first direction in order to effect a rapid advancing movement of said reciprocable member, means operable in response to a predetermined advancing movement of said member for driving said frame from said motor while holding said input shaft against rotation for effecting further advancing movement of said reciprocable member at reduced speed, means operable in response to a predetermined further advancing movement of said member for holding said frame against rotation while driving said input shaft from said motor in a second direction for effecting the retracting movement of said reciprocable member, and means operable in response to a predetermined retracting movement of said member for holding both said frame and said input shaft against rotation.

16. In combination with a reciprocable member, a differential unit having an output shaft, an input shaft and a frame, means rotatably supporting said frame, means including a screw and nut drivingly interconnecting said member and said output shaft, a motor for driving either said input shaft or said frame, means for holding said frame against rotation while driving said input shaft from said motor in a first direction in order to effect a rapid advancing movement of said reciprocable member, means automatically operable in response to a predetermined advancing movement of said member for driving said frame from said motor while holding said input shaft against rotation for effecting further advancing movement of said reciprocable member at reduced speed, means automatically operable in response to a predetermined further advancing movement of said member for holding both said frame and said input shaft against rotation for a predetermined period of time, means automatically operable at the end of said predetermined period for holding said frame against rotation while driving said input shaft from said motor in a second direction for effecting the retracting movement of said reciprocable member, and means automatically operable in response to a predetermined retracting movement of said member for holding both said frame and said input shaft against rotation.

17. In combination with a member to be reciprocated, a bed upon which said member is reciprocable, a geared differential having its output shaft connected with said member, said differential also having a frame journalled in said bed and an input shaft, a motor for driving either said input shaft or said frame, a first electrical means operable to hold said frame against rotation while driving said input shaft from said motor in one direction to effect the initial advancing movement of said reciprocable member, second electrical means automatically operable in response to a predetermined advancing movement of said member for holding said input shaft against rotation while driving said frame from said motor to effect further advancing movement of said member, third electrical means automatically operable in response to a predetermined further advancing movement of said member for holding both said frame and said input shaft against rotation, and electrical timer means automatically operable in response to the expiration of a predetermined period for continuing to hold said frame against rotation while driving said input shaft from said motor in the reverse direction for effecting the retracting movement of said reciprocable member.

CLIFFORD A. BICKEL.
STANLEY A. BRANDENBURG.
THEODORE FOSTER.

REFERENCES CITED

The following references are of record in the file of this patent:

UNITED STATES PATENTS

| Number | Name | Date |
|---|---|---|
| 933,506 | Walpole | Sept. 7, 1909 |
| 1,130,054 | Barnum | Mar. 2, 1915 |
| 1,235,132 | Gaylord | July 31, 1917 |
| 1,554,064 | Bell | Sept. 15, 1925 |
| 1,587,806 | Thompson | June 8, 1926 |
| 1,662,688 | Veber | Mar. 13, 1928 |
| 1,671,057 | Brainard | May 22, 1928 |
| 1,692,487 | Connell | Nov. 20, 1928 |
| 1,837,803 | Weston | Dec. 22, 1931 |
| 2,015,638 | Kahn | Sept. 24, 1935 |
| 2,088,119 | Schiltz | July 27, 1937 |
| 2,096,754 | Oberhoffken et al. | Oct. 26, 1937 |
| 2,145,843 | Maxson | Jan. 31, 1939 |
| 2,209,776 | Kiekhaefer | July 30, 1940 |
| 2,240,506 | Levesque et al. | May 6, 1941 |
| 2,255,739 | Curtis | Sept. 9, 1941 |
| 2,267,114 | Lear | Dec. 23, 1941 |
| 2,285,069 | Vickers | June 2, 1942 |
| 2,355,625 | Bullard | Aug. 15, 1944 |
| 2,374,254 | Zimmermann | Apr. 24, 1945 |
| 2,374,256 | Zimmermann | Apr. 24, 1945 |